US007421477B2

United States Patent
Pettinato

(10) Patent No.: US 7,421,477 B2
(45) Date of Patent: Sep. 2, 2008

(54) REAL-TIME MEDIA CAPTIONING SUBSCRIPTION FRAMEWORK FOR MOBILE DEVICES

(75) Inventor: Richard F. Pettinato, Cardiff by the Sea, CA (US)

(73) Assignee: Media Captioning Services, Carlsbad, CA (US)

( * ) Notice: Subject to any disclaimer, the term of this patent is extended or adjusted under 35 U.S.C. 154(b) by 606 days.

(21) Appl. No.: 11/087,023

(22) Filed: Mar. 21, 2005

(65) Prior Publication Data

US 2005/0210511 A1 Sep. 22, 2005

Related U.S. Application Data

(60) Provisional application No. 60/554,896, filed on Mar. 19, 2004.

(51) Int. Cl.
*G06F 15/16* (2006.01)
*G06F 15/173* (2006.01)

(52) U.S. Cl. .............. 709/207; 709/217; 709/219; 709/227; 709/229

(58) Field of Classification Search ......... 709/217–219, 709/227–229; 707/1, 10; 455/3.01, 403, 455/404.2, 410, 411, 412.1, 412.2, 414.3, 455/414.4, 440
See application file for complete search history.

(56) References Cited

U.S. PATENT DOCUMENTS

| 6,219,537 | B1 | 4/2001 | James et al. |
| 6,513,003 | B1 | 1/2003 | Angell et al. |
| 6,766,163 | B1 * | 7/2004 | Sharma ............. 455/412.1 |
| 6,785,539 | B2 | 8/2004 | Hale et al. |
| 6,847,778 | B1 | 1/2005 | Vallone et al. |
| 6,892,390 | B1 | 5/2005 | Lieberman et al. |
| 7,131,003 | B2 * | 10/2006 | Lord et al. ............. 713/168 |
| 2001/0025241 | A1 | 9/2001 | Lange et al. |
| 2003/0035063 | A1 | 2/2003 | Orr |
| 2003/0149574 | A1 * | 8/2003 | Rudman ............. 705/1 |
| 2004/0006481 | A1 | 1/2004 | Kiecza et al. |

(Continued)

FOREIGN PATENT DOCUMENTS

WO 2005/094429 10/2005

OTHER PUBLICATIONS

Gary D. Robson, "Closed-Captioned Radio", Newswaves Feb. 1997, http://robson.org/gary/writing/nw-capradio.html.

(Continued)

*Primary Examiner*—Jeffrey Pwu
*Assistant Examiner*—Scott M Sciacca
(74) *Attorney, Agent, or Firm*—Fish & Richardson P.C.

(57) ABSTRACT

A subscription-based system for providing caption information for one or more mobile devices includes a communication network. Some techniques employed feature a system for providing subscription services for near-real time caption information for one or more mobile devices. The system includes a communication network for communicating to the one or more mobile devices, a transcriber connected with the communication network and configured for transcribing an event to generate caption data. The caption data includes transcribed data and control code data. The system includes a subscription gateway configured for near real time transfer of the transcribed data over the communication network to the one or more mobile devices. The subscription gateway is configured to provide access for the transcribed data to the one or more mobile devices.

25 Claims, 9 Drawing Sheets

U.S. PATENT DOCUMENTS

| | | |
|---|---|---|
| 2004/0103372 A1 | 5/2004 | Graham |
| 2004/0171371 A1 | 9/2004 | Paul |
| 2005/0108026 A1 | 5/2005 | Brierre et al. |
| 2005/0210511 A1 | 9/2005 | Pettinato |
| 2005/0210516 A1 | 9/2005 | Pettinato |
| 2005/0227614 A1 | 10/2005 | Hosking et al. |

OTHER PUBLICATIONS

"Close Captioning—Captioning Overview FAQ", http://robson.org/capfaq/overview.html.

Ken Kershbaumer, "WRAL Goes Cellular" Broadcasting&Cable, Dec. 20, 2004.

"Town council sets precedent for closed-captioning of meetings," http://www.northpeel.com/br/gi/news/story/3118425p-3617435c.html, 3 pages, (accessed on Dec. 16, 2005).

"Wireless Audio Captions Now Possible," http://abclocal.go.com/kgo/story?section=edell&id=3587915, 9 pages, (accessed on Dec. 16, 2005).

* cited by examiner

US 7,421,477 B2

REAL-TIME MEDIA CAPTIONING SUBSCRIPTION FRAMEWORK FOR MOBILE DEVICES

CROSS REFERENCE TO RELATED APPLICATIONS

This application claims the benefit of priority from U.S. Provisional Application entitled "A Real-Time Captioning Framework for Mobile Devices", Application No. 60/554,896 filed Mar. 19, 2004 by Richard F. Pettinato et al., the disclosure of which is incorporated by reference. This application is cross-related to U.S. application Ser. No. 11/043,229 filed on Jan. 25, 2005.

TECHNICAL FIELD

The present disclosure relates to media content, in particular media content that is captioned for mobile applications and devices.

BACKGROUND

Traditional captioning devices, such as televisions and display monitors, combine text with a video broadcast, in which the text represents a transcribed audio portion of the video. The captions can be either closed captions or open captions. For closed captions, the caption data is embedded in a video signal, and the captions are not displayed unless they are decoded. The text or caption data is embedded in line 21 of the vertical blanking interval (VBI) in analog television. The VBI is an interval in a television signal that temporarily suspends transmission of the signal for an electron gun to move to the first line of a television screen for the next screen field. The VBI can be used to carry data, such as a test signal or the closed-captioning data.

Closed captioned data created for analog television may use protocols described by the EIA (Electronics Industry Association) 608 Standard. Closed captioned protocols for digital television may be described in the ELA 708 Standard. In a digital transmission, such as with high-definition television, the EIA 708 captioning data can be encoded in user data packets in an MPEG compressed video stream.

When captions are decoded, the captions can be displayed on the screen. Typically, captions can be decoded at the display device. Open captions may be already decoded in the video signal and may be displayed on screen, such as subtitles in foreign films. In broadcast transmission systems, caption data may be transmitted to an encoder that may include text and control codes.

Caption data may also be provided to the internet using transcribed data from broadcast sources, such as broadcast radio or television signals. For instance, a caption writer for a radio station may transcribe a broadcast program from the radio station to post on the radio station's web page. In another example, a caption writer may caption the audio portion of a television signal and send the caption data to an encoder device at a broadcast facility for inclusion in the video transmission.

SUMMARY

The present disclosure describes methods, systems, and techniques for subscription-based services for captioned media content. Information f created in real time and accessible to mobile devices. The information may include special reports, emergency news, alerts, news updates on a variety of topics, and reports on sports and/or financial news. Some information may be accessible to mobile devices on a fee basis via an authentication mechanism utilizing user names and password protection. Alternatively, some information may be freely provided, as long as the mobile device user remains a subscriber. The content sent to the user may be individually customized based on the subscriber's preferences.

In one general aspect, the techniques feature a system for providing subscription services for near-real time caption information for one or more mobile devices. The system includes a communication network for communicating to the one or more mobile devices, a transcriber connected with the communication network and configured for transcribing an event to generate caption data. The caption data includes transcribed data and control code data. The system includes a subscription gateway configured for near real time transfer of the transcribed data over the communication network to the one or more mobile devices. The subscription gateway is configured to provide access for the transcribed data to the one or more mobile devices.

Advantageous implementations can include one or more of the following features. The system can be configured to transfer transcribed data to at least two mobile devices simultaneously. The communication network may involve the Internet, and the subscription gateway can be configured to send notices and alerts to subscribers using the one or more mobile devices based on subscriber preferences.

The system also includes an external subscription database to store information associated with subscribers of the near real time caption information. The use of subscriber preferences may involve sending transcribed event information to a mobile device of the subscriber based on any of an area code, a country code, and a zip code.

The system may also include a device with captioning functionality and a display to present caption data and a decoder to decode the caption data for presentation on the device comprising captioning functionality. The system may be further configured for near real time transfer of the caption data to the decoder.

The subscription gateway may include a transcription device interface to interact with the transcriber, an encoder interface to interact with an external encoder that encodes the caption data, and a subscriber database to store information associated with subscribers of the near real time caption information. The subscription gateway may also include a subscriber database interface to interact with an external subscriber database that is configured to store information associated with subscribers of the near real time caption information. The information associated with the subscribers may include subscriber preferences for caption information. The subscription gateway may have a communication network interface to interact with the communication network and transmit event data, as well as a server interface to interact with an external server. The one or more mobile devices can be configured to interact with the external server and the communication network.

In another general aspect, a subscription-based method for sending near real time caption information to one or more mobile devices involves transcribing an event to generate device-generated caption data having control codes, removing the control codes from the caption data to produce text data, searching a database of caption information subscribers to locate one or more subscribers subscribed to receive the text data for the event, and sending the text data to one or more mobile devices over a communication network.

Advantageous implementations can include one or more of the following features. The method may also involve receiving information associated with zip codes, telephone country codes, telephone number area codes, and city and state names from the one or more mobile devices. The method may involve comparing any of the received information with zip codes, telephone country codes, telephone number area codes, and city and state names stored in the database, and providing event data to the one or more mobile devices when information received from the one or more mobile devices corresponds with similar or the same information stored in the database.

The communication network may include any one of a satellite channel, a telephony channel, an optical channel, a wireless channel, a cable channel, and an internet channel. The event data provided may be based on a geographic region relating to any of the zip codes and telephone codes, in which the event data may include local news, weather alerts, traffic reports, and emergency information. The method may involve presenting one or more real-time captioning streams from one or more events to subscribers using one or more mobile devices based on subscriber preferences. The method may include authenticating subscribers based on a user name and a password stored in the database, in which the transcribing involves using a transcription device to add control codes to the transcribed data. The method may involve encrypting the text data and/or the subscriber data prior to sending the text data to the one or more mobile devices over the communication network. The text data and subscriber preferences can be displayed on the one or more mobile devices.

In another general aspect, an article including a machine-readable medium storing instructions operable to cause a machine to perform operations including receiving information from a mobile device for subscriber preferences for media content to be sent to the mobile device, and searching a database that has information for subscribers of media content. The media content involves real-time streaming data of transcribed data sent over a communication network. The operations include sending the transcribed data to the mobile device, in which the subscriber preferences include a zip code, an area code, and/or a country code.

Advantageous implementations can include one or more of the following features. The transcribed data may include control code data for a caption target. The caption target may have closed-captioning functionality. The text data can be sent to the mobile device and the transcribed data can be sent to the caption target simultaneously. The text data can be sent to the mobile device and the transcribed data is sent to the caption target in near real time.

The operations may include selecting the media content based on any of a zip code, an area code, and a country code, and sending an alert to the mobile device that media content is available to the sent to the mobile device. The media content can include news, weather alerts, traffic reports, and emergency information that is specific to any of the zip codes, area codes, and/or country codes.

In one general aspect, the techniques feature a system for providing near real time caption information for one or more mobile devices. The system includes a communication network for communicating to the mobile devices, and a transcriber connected with the communication network. The transcriber is configured to transcribing an event to generate caption data, in which the caption data includes transcribed data and control code data. The system is further configured for near real time transfer of the transcribed data over the communication network to the one or more mobile devices.

In another general aspect, the techniques feature a method for sending near real time caption information to one or more mobile devices. The method involves transcribing an event to generate caption data having control codes, removing the control codes from the caption data to produce text data, and sending the text data to one or more mobile devices over a communication network.

In another general aspect, the techniques feature an article that includes a machine-readable medium storing instructions operable to cause operations involve generating transcribed data from a transcription device, sending text data from the transcribed data to a mobile device using a communication network, and sending the transcribed data from the transcription device to a caption target. The text data is sent to the mobile device and the transcribed data is sent to the caption target simultaneously. The text data is sent to the mobile device and the transcribed data is sent to the caption target in near real time.

In another general aspect, the techniques feature an article that includes a machine-readable medium storing instructions operable to cause operations involve transcribing audio data from a radio broadcast, and sending the transcribed audio data to at least one mobile device using a communication network. The operation of sending the data involves near real-time transmission of the transcribed audio data. The communication network is coupled to at least one mobile device.

A transcription device may be used in the operation of transcribing the audio data. The operations may also include using a software program to remove closed-captioning control codes from the transcribed audio data prior to sending the transcribed audio data to at least one mobile device. The transcribed audio data may involve audio data that is transcribed into text data. The audio data may be voice data.

In one exemplary implementation, a system includes a communication network, such as the Internet, and one or more mobile devices coupled to the communication network. The system includes a transcription device to transcribe data in real time or near real time (real time with a small time delay). The transcribed data includes text data and control code data. The control code data is used by one or more captioning devices to display caption data. The control code data is removed from transcribed data, and the mobile devices receive text data via the communication network. The system can simultaneously send transcribed data to one or more captioning devices, while sending the text data to one or more mobile devices. Subscribers of transcribed media content can receive real time news reports, emergency information, and alerts on their mobile devices.

Details of one or more implementations are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

Figure 1:
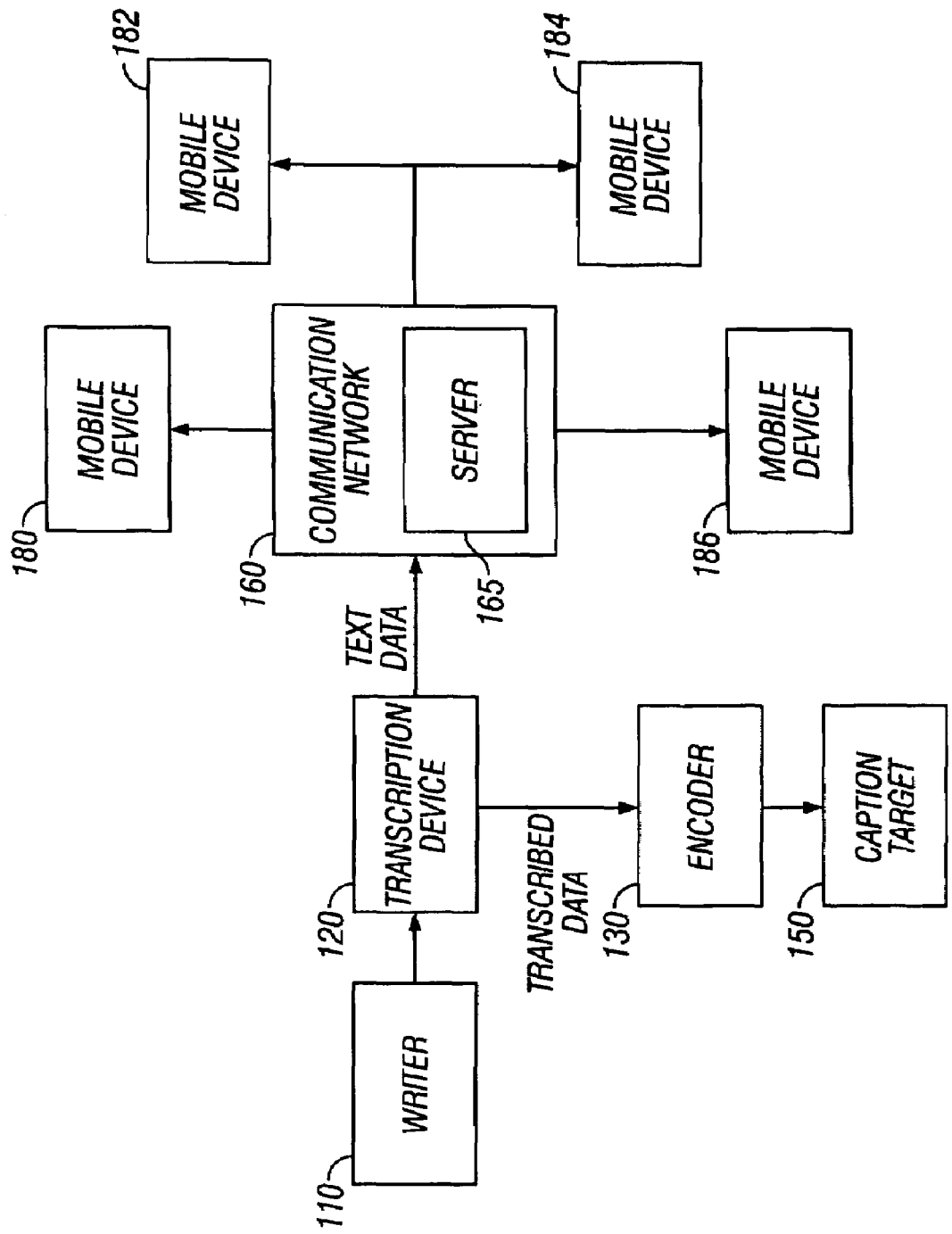
FIG. 1 shows an exemplary block diagram of the captioning system.

The following detailed description makes reference to the accompanying drawings. Other embodiments of the present invention are possible and modifications may be made to the embodiments without departing from the spirit and scope of the invention. Therefore, the following detailed description is not meant to limit the invention.

Moreover, for convenience in the ensuing description, some explanations of terms are provided herein. However, the explanations contained herein are intended to be exemplary only. They are not intended to limit the terms as they are described or referred to throughout the specification. Rather these explanations are meant to include any additional aspects and/or examples of the terms as described and claimed herein and/or as used by one of skill in the art.

The following describes various tasks, techniques, and systems relating to fee and/or subscription-based services for closed-captioned media content. The present disclosure describes methods and systems that involve a fee and/or subscription-based framework for sending real-time caption data from a caption writer to one or more mobile devices through a communication network, such as the internet, while simultaneously having the ability to send caption data to traditional captioning devices, such as a television or monitor that can display captioned information.

The caption writer refers to a person, such as a stenographer, who transcribes data from a source presentation or an event. The data may be from a "live" event, such as a sporting event, an academic presentation, or a financial news report. The data can be audio and/or video data that is transcribed into text data. The caption writer may also transcribe the data remotely, in which the writer does not have to be physically present to perform the transcription. The writer may remotely listen to and/or watch the event using a telephone and/or a monitor or television set. The event may or may not be an event that is broadcasted, such as an event using broadcast television or radio signals.

In some implementations, a subscriber system can use a password to authenticate a subscriber for the service. User names and user preferences may be stored in one or more databases. The subscriber system can be used to alert mobile device users to captioned data that may be available from video and/or radio programmers. In some implementations, the real-time data may be created using captioning stenographs that are based on voice recognition technologies. The caption data can be produced in a data stream that may have control codes or may not have control codes. The data stream can be transmitted by a server or server program as Transmission Control Protocol with Internet Protocol (TCP/IP) packets to one or more mobile device users in real-time.

In some implementations, real-time captioned data can be sent in a real-time data stream to mobile devices. The real-time captioned data can be accessed by mobile device users on a subscription basis. Each user may have a user name and password, and the mobile device users may have the ability to select from among a group of content service providers. In some implementations, the mobile device users can enter zip codes, telephone country codes, telephone number area codes, city and state names by comparing zip code/phone or country codes preferences to the content providers zip code/phone and complete telephone numbers to enables subscribers to choose from among a range of real-time captioning streams that may be available. Some of the captioning streams may be local and specific for a geographic region, such as for local news, weather alerts, traffic reports, and emergency information. Each mobile device user may set up individualized user preferences on the desired content. An alert can be sent to a subscriber if the user's preferences match the content provided by video and/or audio listed providers in the database. The providers may have content that is specific for various zip codes, country codes or area codes.

The caption information may be delivered from a provider of captioning services or from a content provider and a captioning service that transcribes the content provider's information. In some implementations, the real-time captioning/transcription can be provided from a content provider to enable transmission of captioned information with caption codes to a captioning encoder, or to the captioning encoder and one or more mobile devices simultaneously. Also, the real-time captioned data from caption service providers can be sent to a communications network from decoded output of one or more content provider stations. The real-time captioned data can be verified in a database with subscriber preferences. The system can provide for user authentication by using user names and passwords, and can issue alerts and notifications to subscribers of the availability of real-time captioned data on video and/or radio programs that have captioned data. In some implementations, the notifications may include notifying subscribers of the availability of real-time captioned data on video and radio programs that have captioned data that is outside the preferences of the subscribers, but may be related to the preferences of the subscribers. For example, an alert may be issued for a weather report of dangerous weather conditions in a local area, and a subscriber may also be notified that captioned data is available for local traffic conditions in that weather.

As shown in FIG. 1, the captioning system can simultaneously send caption information to traditional captioning devices/targets 150 and mobile devices 180, 182, 184, 186. The captioning targets 150 receive transcribed data, which includes text data entered by the writer 110 and control code data for the captioning device 120. The mobile devices 180, 182, 184, 186 are connected to a communication network 160 and receive text data, and not the control code data. The control code data can be removed from the transcribed data prior to sending data to the communication network 160.

FIG. 1 shows a block diagram of a captioning system, in which one or more users receive real-time closed-caption data on one on more mobile devices. The caption writer 110 listens to and/or watches an event, and transcribes that event into text data using a transcription device 120. The transcription device 120 may include a transcription-type device or a stenographic-type device. The transcription device 120 includes software and/or hardware to aid in the captioning process, and may have software to add control code data to the transcribed data in a captioning process. The control code data are used in traditional captioning devices for displaying captioned text on a monitor. The transcription device 120 may have software and a keyboard to enable the caption writer 110 to transcribe at rates of up to hundreds of words per minute. For example, the device 120 may have a stenographic keyboard or may include a computer having voice recognition software.

The transcribed data from the writer is sent to the transcription device 120 that sends the transcribed data to an encoder 130. The encoder 130 uses the control codes to encapsulate the transcribed data for presentation on a caption target 150. The caption target 150 can refer to a monitor or a television with closed-captioning functionality.

Instead of or in addition to sending transcribed data to an encoder, the transcription device 120 may remove the control code data from the transcribed data and send text data to a communication network 160 to enable for one or more users to access the text data. Examples of communication networks include various forms or mediums of data communications, such as a local area network ("LAN"), a wide area network ("WAN"), a wireless local area network ("WLAN"), and a personal area network ("PAN"). Other examples of communication networks include a mobile communication network using a multiple access technology, such as a cellular phone network with Code Division Multiple Access, ("CDMA"), a satellite network, and the Internet.

In sending the text data to the communication network 160, the transcription device 120 may have software to remove the control codes from the transcribed data before sending the data to the communication network 160. In removing the control codes, the data that is transmitted to components includes text data. The text data can be sent to the communication network 160 and can be displayed on one or more mobile devices 180, 182, 184, 186, such as computers, cell phones, and personal digital assistants (PDAs). The communication network 160 interacts with a server 165 to communicate with multiple devices. The server 165 may refer to one or more hardware servers, or software servers, such as a server program. The text data may be displayed as scrolling text data, in which the text is updated as the mobile device 180 receives text. The devices may be internet-compatible devices and may be connected through a cellular phone network. As used herein, a mobile device may also refer to any general-purpose mobile machine that processes data according to a set of instructions that is stored internally either temporarily or permanently, including, but not limited to, general-purpose mobile computers, laptop computers, internet-compatible mobile phones, wired or wireless laptop computers. Mobile devices also include satellite-based transmission devices, smart client devices (that actively fetch data and store data locally), wireless devices, a cellular or mobile telephone, an electronic handheld unit for the wireless receipt and/or transmission of data, a media content playable device, such as an MP3 player, or the like. Each device may have a specific or unique internet address, in which the communication network may direct data to one or more devices based on the device's internet address.

To provide for interaction with a user, each of the mobile devices 180, 182, 184, 186 uses a display, such as a cathode ray tube (CRT) or liquid crystal display (LCD) monitor, which displays information to the user and a keyboard and/or a pointing device, such as a mouse or a trackball, to serve as input to the mobile device. The mobile device may provide feedback to the user with any form of sensory feedback, such as visual feedback or tactile feedback.

The communication network 160 may include a back end component, such as a data server, or a middleware component, such as an application server, or a front end component, such as a client computer having a graphical user interface, portal, or a Web browser through which a user can interact with an implementation of the systems and techniques described here. The mobile device 180 itself may have a front end component that includes a graphical user interface. In general, the communication network 160 and/or the mobile device 180 may use any combination of such back end, middleware, or front end components.

The software (also known as programs, software tools or code) in the captioning system of FIG. 1 may include machine instructions for a programmable processor, and can be implemented in a high-level procedural and/or object-oriented programming language, and/or in assembly/machine language. The mobile device 180 may have an Application Programming Interface (API). For example, the mobile device 180 may also run on a Binary Runtime Environment for Wireless (BREW) platform, an open-source on-line application development platform for wireless CDMA devices from Qualcomm, Inc. of San Diego, Calif. The BREW platform can allow application developers to write programs and scripts in various software languages, such as C, C++, JAVA, and XML. The mobile device 180 may have a software media player, such as a Windows media player, that can show the text data and/or a video presentation of the transcribed event.

As used herein, the term "machine-readable medium" refers to any computer program product, apparatus and/or device used to provide machine instructions and/or data to a programmable processor, including a machine-readable medium that receives machine instructions as a machine-readable signal. The machine-readable medium refers to magnetic discs, optical disks, memory, Programmable Logic Devices (PLDs), and the like. The term "machine-readable signal" refers to any signal used to provide machine instructions and/or data to a programmable processor.

In the described system, the caption writer 110 can be located remotely from the source of the transcribed event. Also, the data can be sent to a mobile device using the communication network 160, such as the internet. Internet-compatible devices with displays can present captioned text in real time or near real time. The transcribed data can be presented on a traditional caption target 150 and a mobile device 186 simultaneously.

The captioning system can send the data to multiple devices, as well as sending the data to multiple devices simultaneously. Moreover, the writer 110 can transcribe the information of the event, and the transcription device 120 can send the data to one or more targets and/or devices in real time or near real time. In one implementation, a device can allow a user to save and retrieve any part of a captioned message on their device. Alternatively, a user can download a saved text captioned message from a web site for subsequent viewing. For example, if a user wants to read what happened in the last two minutes of a basketball game, the user can log on to a website to access all or only a selected portion of the captioned play-by-play information.

Figure 2A:
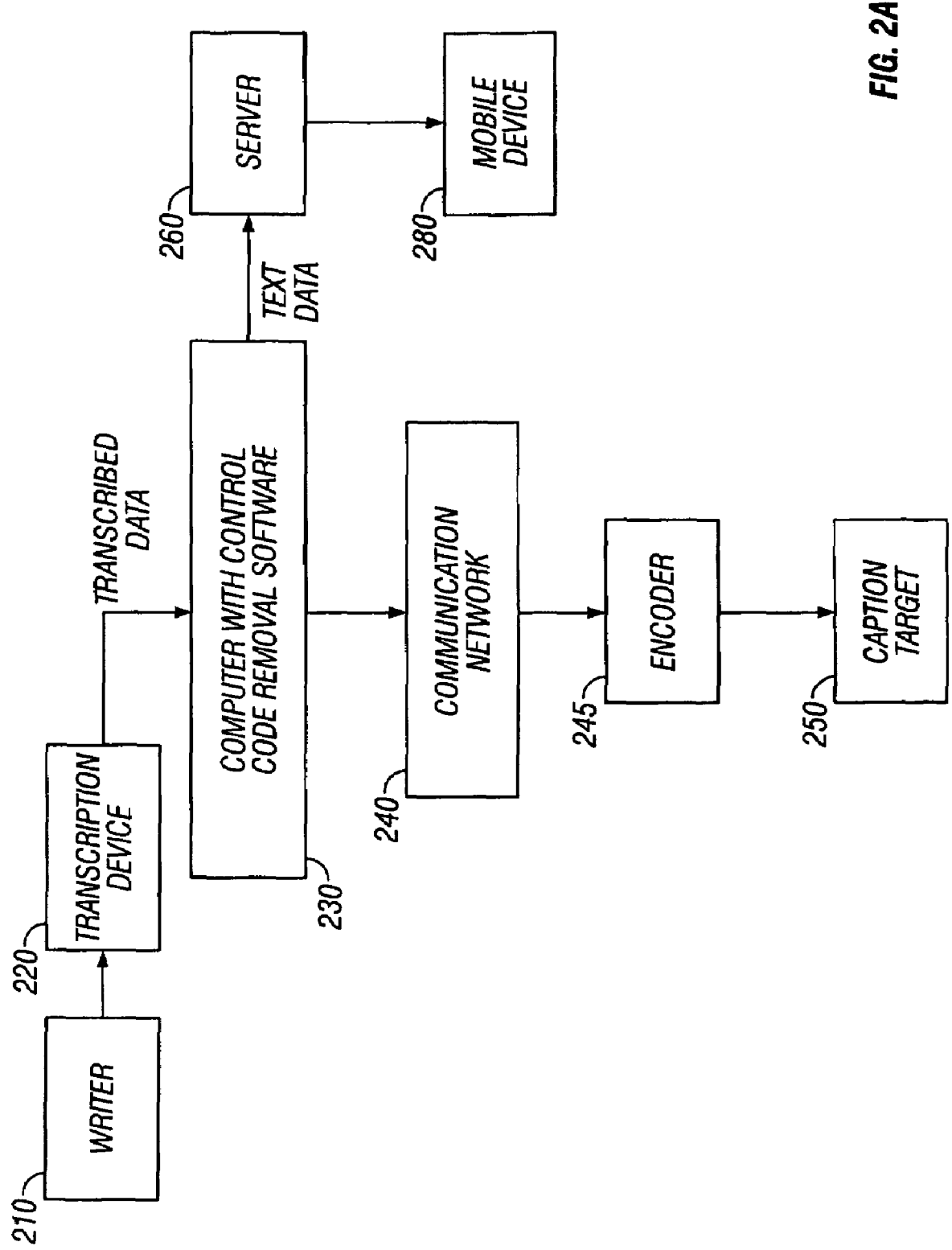
FIGS. 2A-2B show exemplary block diagrams of the captioning system.

FIG. 2A shows another implementation of a mobile captioning system. The captioning system can simultaneously send caption information to traditional captioning devices/targets 250 and a mobile device 280. In FIG. 2A, the mobile captioning system can strip out the control code data in the transcribed data in the device 220 to have plain ASCII text (American Standard Code for Information Interchange) to be sent to the mobile device 280. Instead of or in addition to sending the data to the mobile device, the mobile captioning system can send the transcribed data with the control code data from the device 220 to an encoder 245 to provide close captioning at a caption target 250, such as a television or monitor. This can be performed using remote caption writing, and may be accomplished simultaneously and/or in real time or near real time.

In FIG. 2A, a writer 210 transcribes the event data that they hear or see into a device 220 that sends the data to a computer 230. The transcription device 220 includes a computer with software to add control code data to the text produced from the writer 210. The event data may or may not be broadcasted over conventional television or radio channels. The data is sent from the computer 230 to a communication network 240 and then to an encoder 245. As described above, the communication network 240 may include a modem, an internet channel, and/or a telephony channel. The encoder 245 encaptions the data at the caption target 250 so that the data is put into a format for presentation on a television or a monitor, such as utilizing line 21 of the VBI as described above. The caption target 250 itself has a decoder to decode the encaptioned data from the encoder 245 prior to presenting the text on the monitor.

Alternatively and/or simultaneously, software in the computer 230 removes the control codes from the transcribed data and sends text data to a server 260. The server 260 may be implemented in hardware or software. The server 260 sends the text data to the mobile device 280. In one implementation, the server may send the text data to the mobile device using a communication network, such as the internet. The mobile device 280 can receive the data from the communication network through a router, such as a cable, DSL (Digital Subscriber Line) router, or a router in an enterprise or business environment.

The server 260 can send the text data to the mobile device 280 via an internet address. In one implementation, the mobile device 280 has a particular internet address. As the text data is routed through the internet, the text data is routed to the internet address of a particular mobile device 280. In this aspect, the mobile device 280 is a client to the server 260.

Instead of being located in the computer 230, the software or program to remove the control code data from the transcribed data can be distributed among one or more components of FIG. 2A. In one implementation, the control code data may be removed by software located in the device 220 itself, as described in FIG. 1. The transcribed data may then be sent to the caption target 250 and/or the text data may be sent to the mobile device 280 without using the computer 230.

In another implementation, both the caption target 250 and the mobile device 280 can receive the transcribed data with the control code data. The mobile device 280 itself may have software to remove the control code data. The device 280 can have control code removal abilities without having to require control-code-removing software in another component of the system.

Figure 2B:
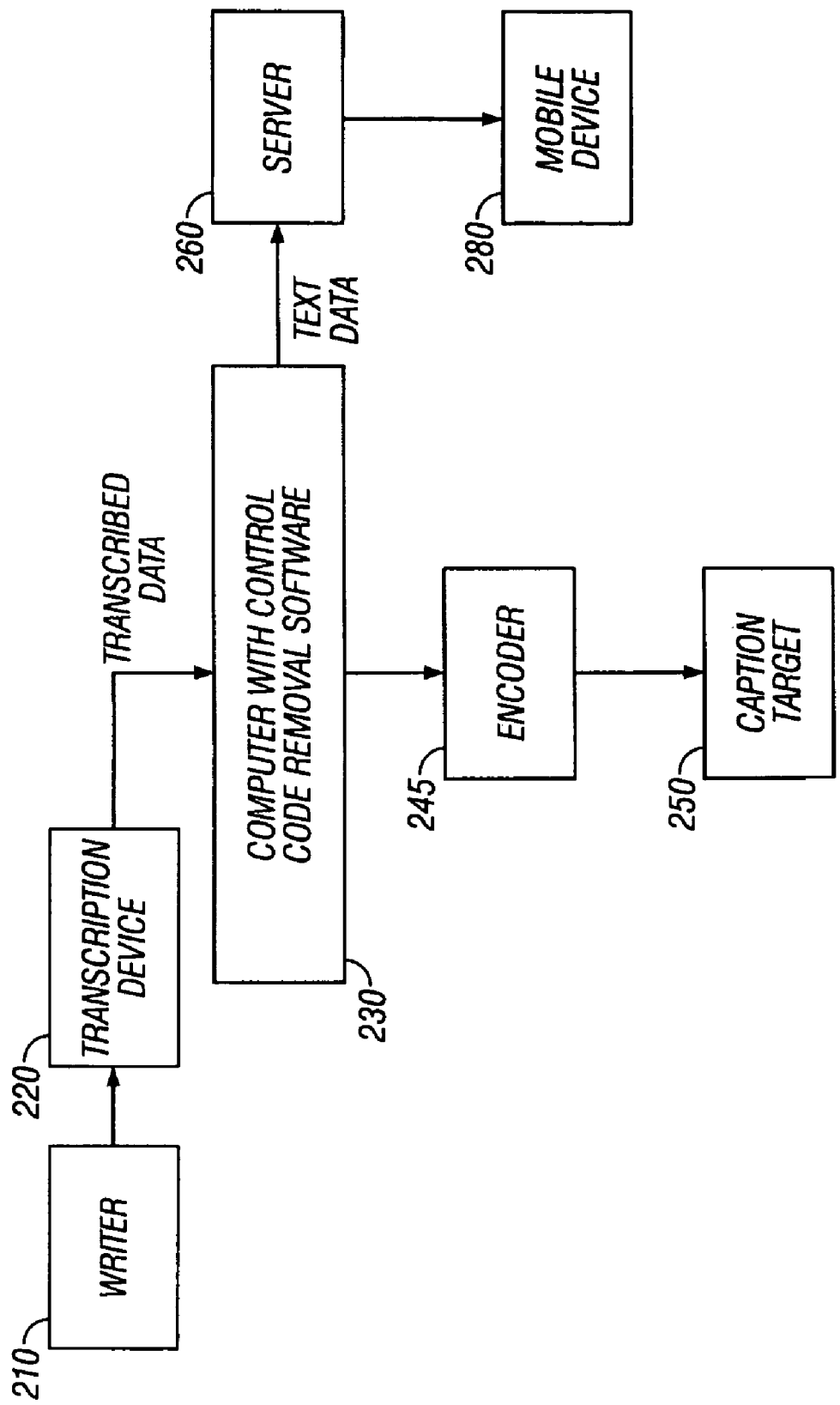

FIG. 2B shows another implementation of the captioning system described with respect to FIG. 2A. In FIG. 2B, the data is sent from the computer 230 to the encoder 245 to encaption the data at the caption target 250. Text data is sent from the computer to the server 260. The server 260 interacts with a mobile device 280 to present the text data on the mobile device 280.

Figure 3:
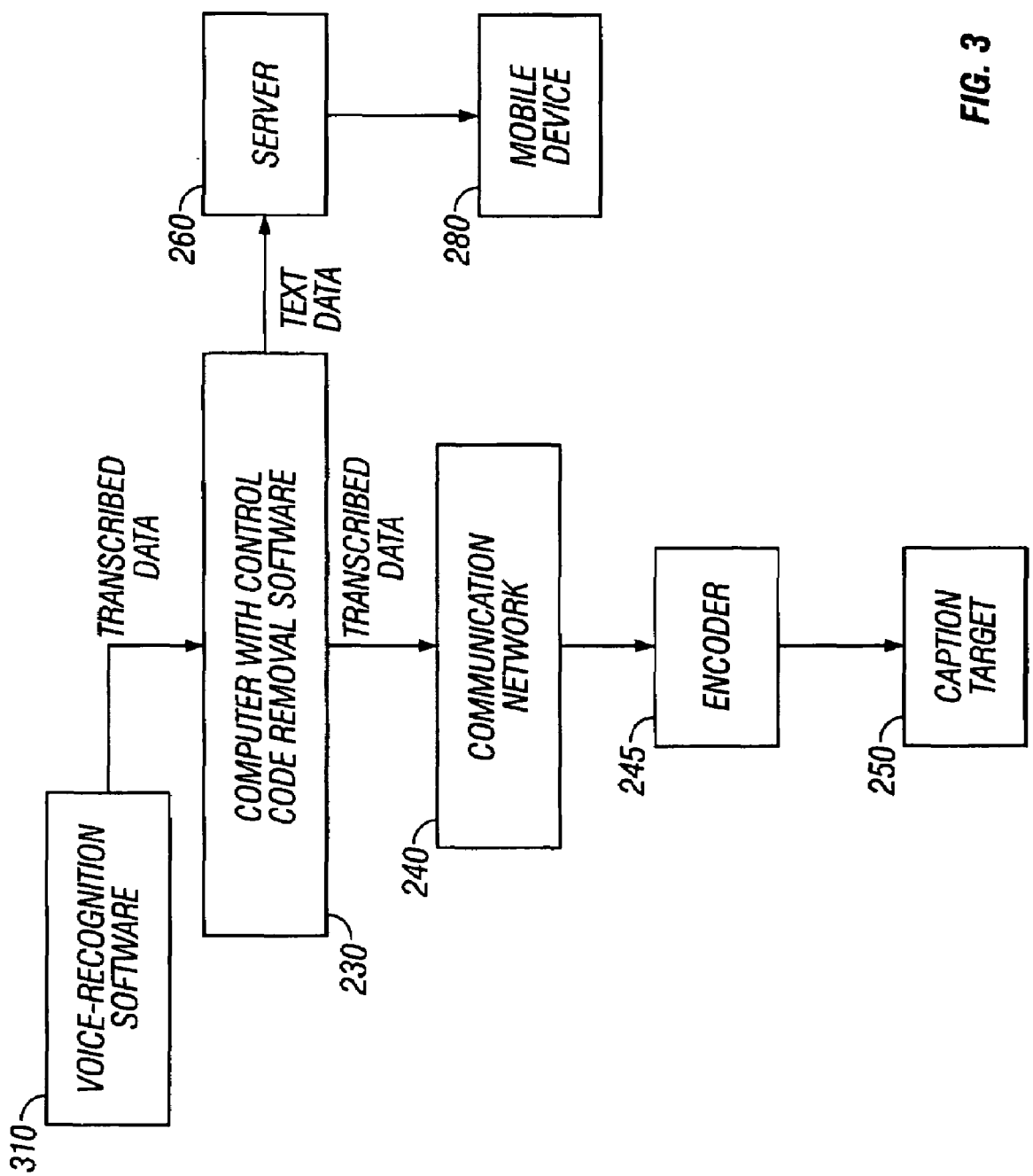
FIG. 3 is an exemplary block diagram of the captioning system with voice-recognition software.

In an alternative implementation shown in FIG. 3, voice-recognition software can be used to generate caption information. Voice-recognition software 310 can be used instead of the writer 210 and the transcription device 220. The voice recognition software can convert speech/audio input into transcribed data output. The transcribed data can include control codes to be sent to the caption target 250. At the same time, the voice-recognition software can output the text of the transcribed data to be sent to the mobile device 280.

Figure 4A:
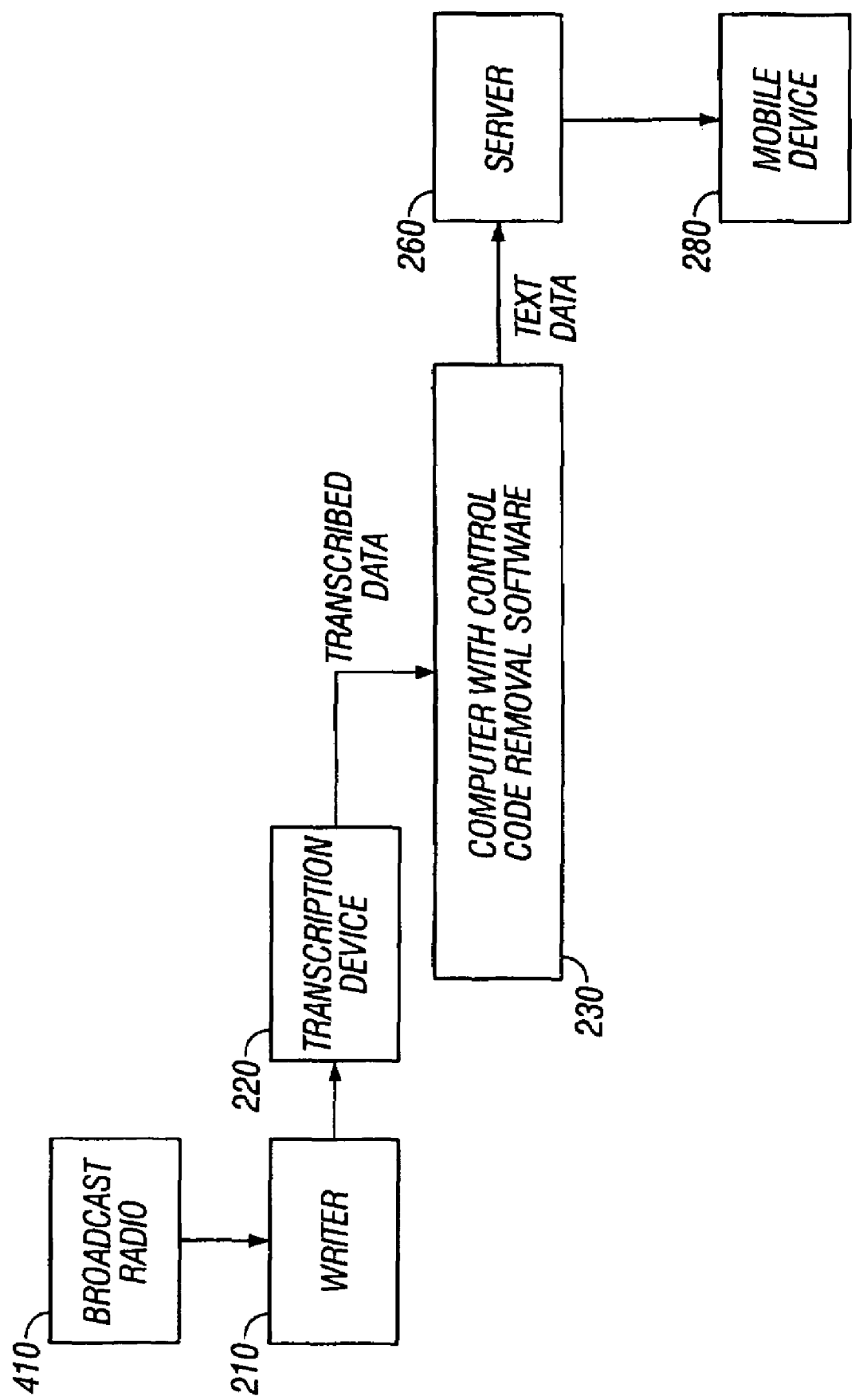
FIGS. 4A-4B show exemplary block diagrams of the captioning system with broadcast radio.

FIG. 4A shows an implementation of the captioning system in which broadcast radio 410 is used as a source of information for the caption writer 210. In this implementation, a caption writer 210 listens to a radio broadcast and transcribes the broadcast information into text data using the transcription device 220. As described with respect to FIG. 2, the mobile captioning system can strip out the control code data in the transcribed data in the device 220, or software in the computer 230 can remove the control codes from the transcribed data before sending the text data to the server 260. The server 260 sends the text data to the mobile device 280.

Figure 4B:
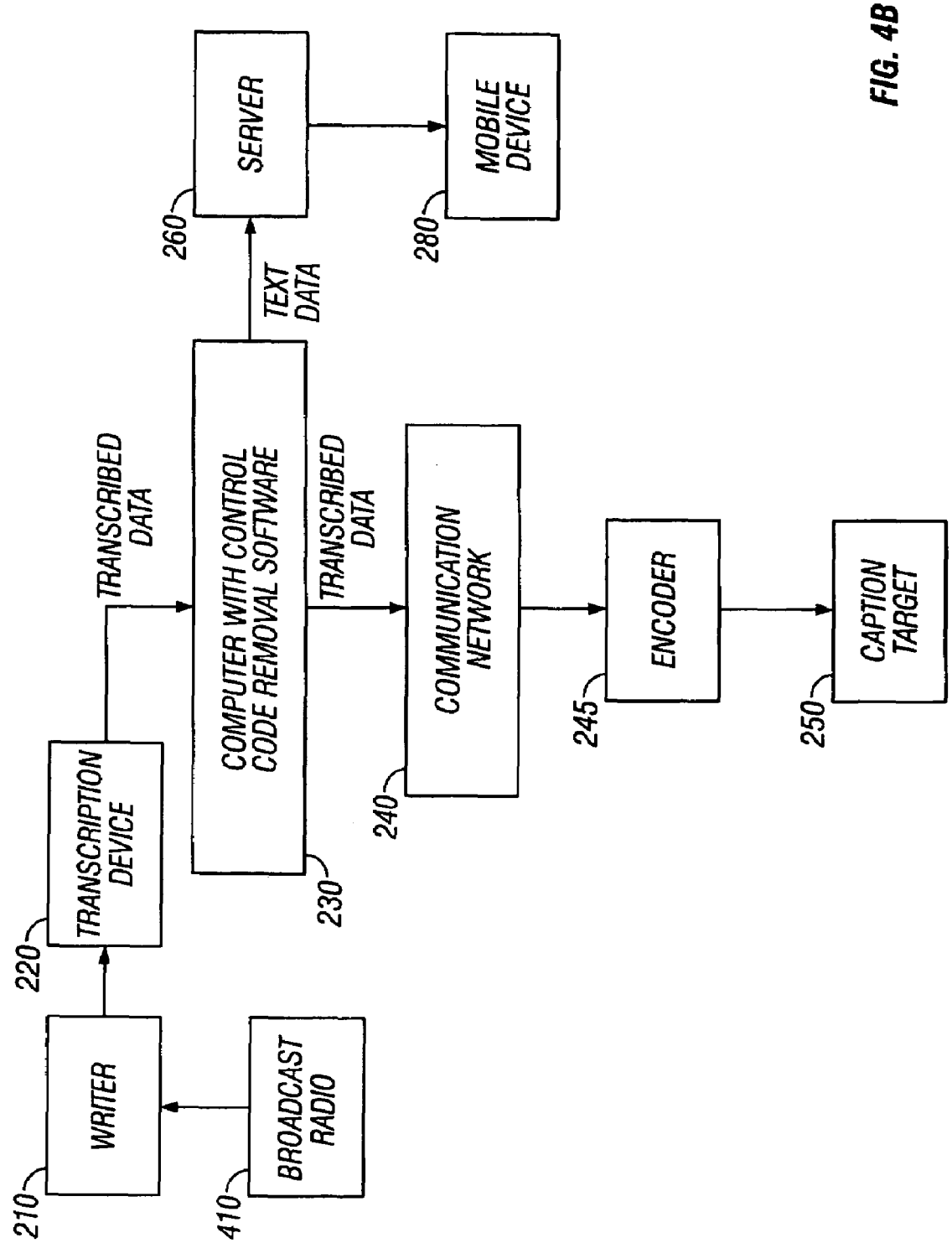

FIG. 4B shows another implementation of the captioning system shown in FIG. 2A with a radio broadcast 410 information source for the caption writer 210. The captioning system can simultaneously send caption information to traditional captioning devices/targets 250 and a mobile device 280. The mobile captioning system can strip out the control code data in the transcribed data in the device 220 to have text data (to be sent to the mobile device 280). Instead of or in addition to sending the data to the mobile device, the mobile captioning system can send the transcribed data with the control code data from the device 220 to an encoder 245 to provide close captioning at a caption target 250, such as a television or monitor. This operation can be performed using remote caption writing, and may be accomplished simultaneously and/or in real time or near real time. The transcription of the radio broadcast 410 provides transcribed data from a real time audio source.

Figure 5A:
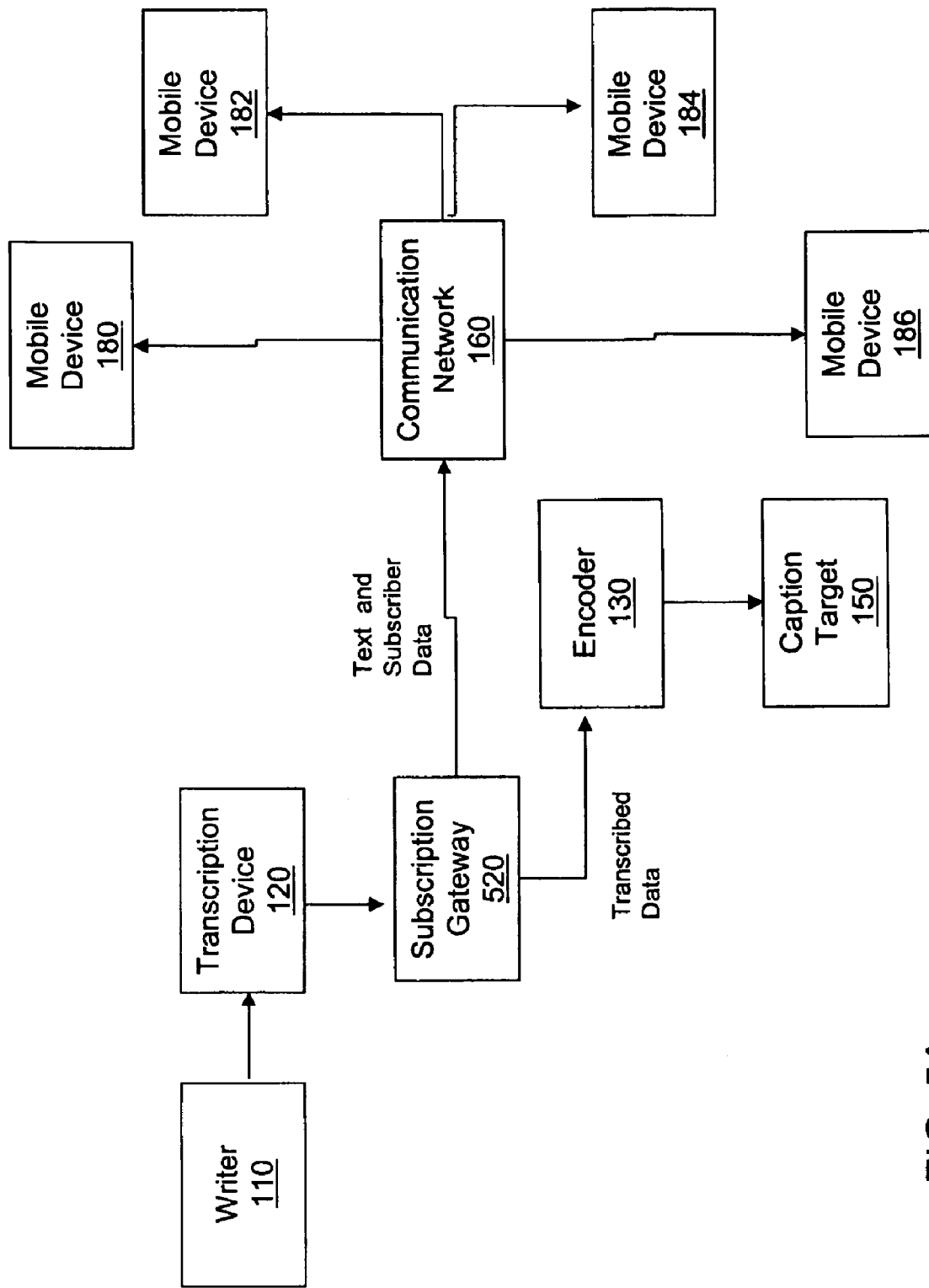
FIGS. 5A-5B shows exemplary block diagrams of the subscription-based captioning system.

FIG. 5A shows a block diagram of a subscription-based captioning system, in which one or more users receive real-time closed-caption data on one on more mobile devices for subscribers of captioned content. As described above with respect to FIG. 1, the captioning system can simultaneously send caption information to traditional captioning devices/targets 150 and mobile devices 180, 182, 184, 186. The captioning targets 150 receive transcribed data, which includes text data entered by the writer 110 and control code data for the captioning device 120. The mobile devices 180, 182, 184, 186 are connected to a communication network 160 and receive text data, and not the control code data. Typically, the control code data is removed from the transcribed data prior to sending data to the communication network 160. A subscription gateway 520 receives information from the transcription device 120 and can send transcribed data to the encoder 130 and text and subscriber data to the communication network 160 to send to mobile devices 180, 182, 184, 186. The subscription gateway 520 may have a database with subscriber data, subscription preferences, passwords, user names, subscription plans and accounts, and sources of available media and/or captioned content. The subscription gateway 520 may also authenticate mobile device subscribers and can be used when subscribing new users or unsubscribing users.

Figure 5B:
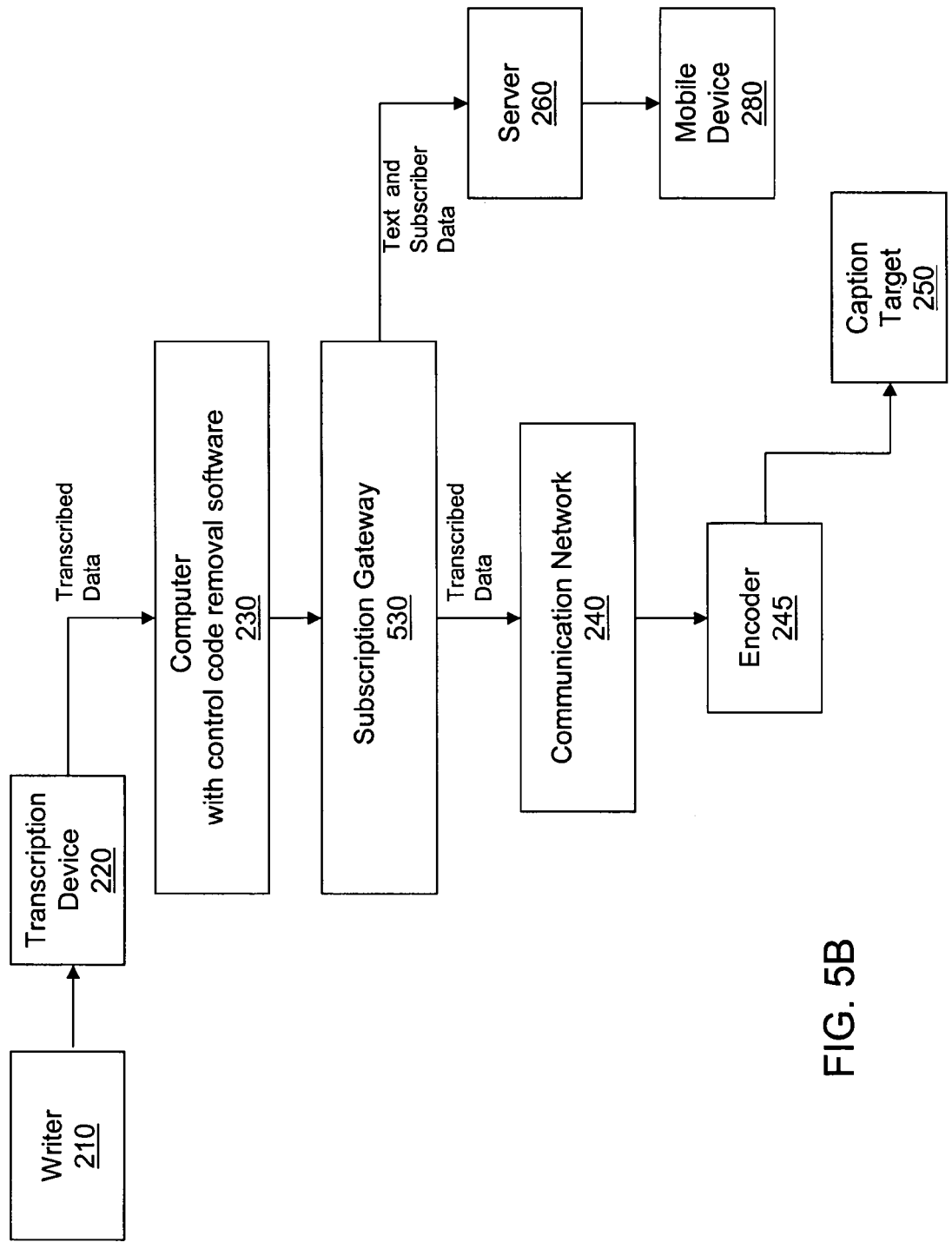

FIG. 5B shows another implementation of a subscription-based mobile captioning system. The captioning system can simultaneously send caption information to traditional captioning devices/targets 250 and a mobile device 280. In FIG. 5B, the mobile captioning system can strip out the control code data in the transcribed data in the device 220 to have plain ASCII text (American Standard Code for Information Interchange) to be sent to the mobile device 280 via the subscription gateway 530. In some implementations, voice recognition software can be used to transcribe the data into ASCII text data. Instead of or in addition to sending the data to the mobile device, the mobile captioning system can send the transcribed data with the control code data from the device 220 to an encoder 245 via the subscription gateway 530 to provide close captioning at a caption target 250, such as a television or monitor. This can be performed using remote caption writing, and may be accomplished simultaneously and/or in real time or near real time.

In some exemplary implementations, the system may include a communication network 240, such as the Internet, one or more mobile devices 280 coupled to the communication network, and a subscription gateway 530. The subscription gateway may be a communication network or a server program. The subscription gateway 530 can receive transcribed data from a transcription device 220. The data may include captioning control codes or the control codes may be removed by a computer using control code removal software 230. In some implementations, the subscription gateway 530 can transmit data to a communication network which will distribute data to a caption encoder 245. The subscription gateway may distribute text data to a server device 260 that may authenticate subscriber data by a user name and a password. The mobile device 280 can display a menu of video, radio, and event programming that is currently transcribed for selection by the subscriber.

In another implementation, the transcription device can transmit data to the subscription gateway The subscription gateway may be connected to a communication network which can transmit authentication data, user name, password data, and other subscriber data information from mobile device users. The subscription gateway can provide data encryption and authentication of subscriber-related data using the user names and password authentication.

Figure 6:
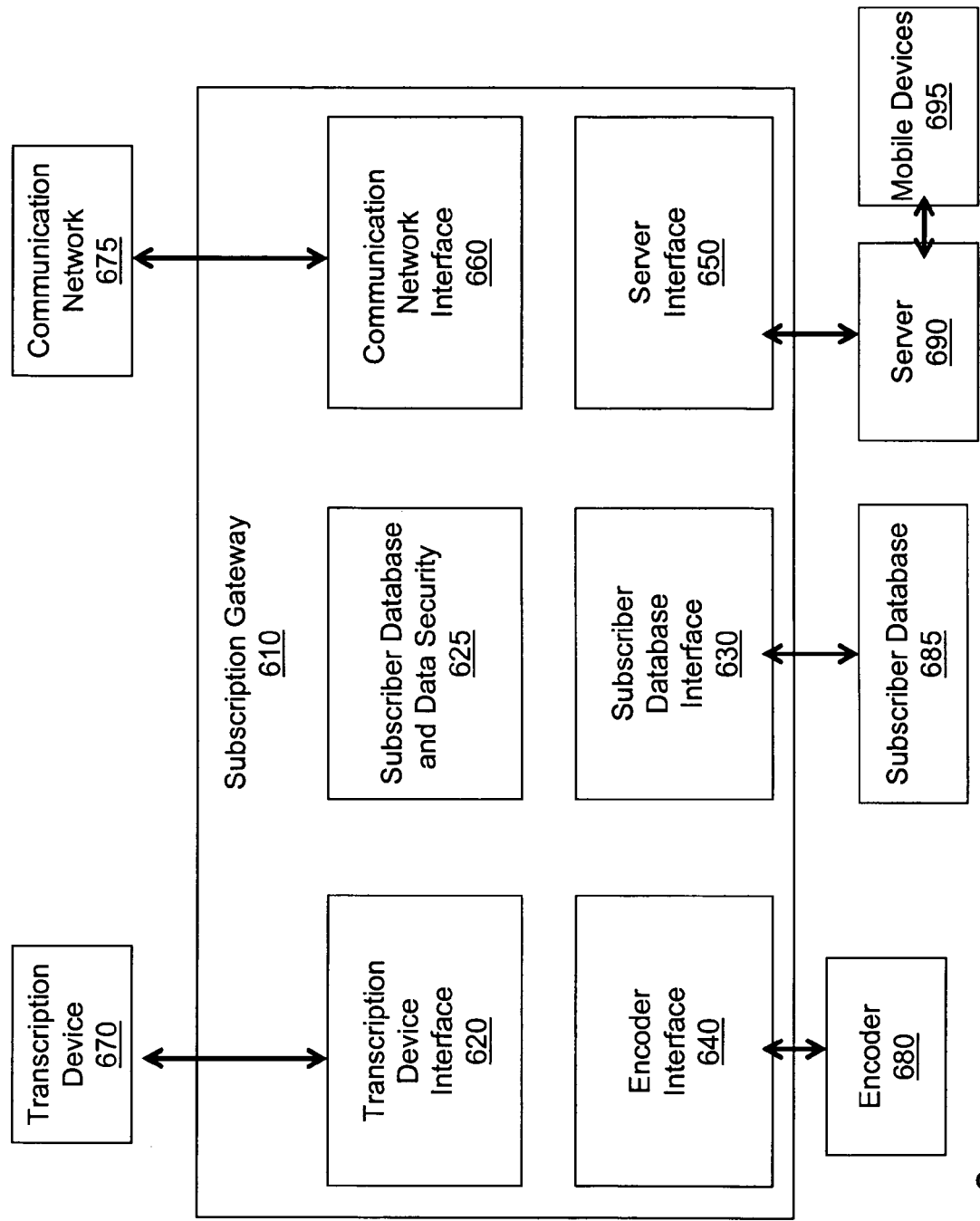
FIG. 6 shows an exemplary block diagram of a subscription gateway.

FIG. 6 shows an exemplary block diagram of a subscription gateway 610. The subscription gateway 610 includes a transcription device interface 620 to interact with an external transcription device 670, an encoder interface 640 to interact with an external encoder 680, a subscriber database and data security (encryption) features 625, and a subscriber database interface 630 to interact with an external subscriber database 685. The subscription gateway 610 includes a communication network interface 660 to interact with a communication network 675. The subscription gateway 610 includes a server interface 650 to interact with an external server 690 and mobile devices 695 coupled to the server 690. In some implementations, the server 690 may be part of the communication network 675. In other implementations, the communication network 675 may couple to one or more mobile devices 695 and/or one or more stations, content providers, or captioning service providers.

In one exemplary implementation, the server interface 650 can compare user name and password authentication information and distribute real-time transcribed information to the server 690. The server interface 650 can process the authenticated subscriber information and, according to user preferences, transmit the transcribed data to the server 690, which is connected to one or more mobile devices 695. In one exemplary implementation, the mobile device user/subscriber can enter a zip code or a country code to display a menu selection of event programming, audio broadcasts, and/or video programming that are being transcribed in real-time, and are available for selection by a subscriber.

In another exemplary implementation, the server interface 650 can compare real-time transcribed data streams from video and radio providers, which can be inserted in the communication network 675 to the communication interface 660 of the subscription gateway 610. The communication interface 660 may be implemented in hardware or software. In some implementations, the communication interface 660 can be used to transmit an alert message to subscribers of the availability of data streams of video and/or radio programming in subscriber profiles by zip code and/or country code. The system can allow the subscriber to select a video program provider for a particular zip code for emergency notifications, as well as to enter user names and passwords in the mobile device. The mobile devices could transmit data via the communication network 675 to the communication network interface 660. Alternatively, the mobile devices 695 could transmit data via the server 690 to the server interface 650. In some implementations, the communication network interface device 660 can authenticate the user names and password information from the external subscriber database 685 through the subscriber data interface 630. Alternatively, the communication network interface device 660 can authenticate the user names and password information from the internal subscriber database 625. The listing of transcribed real-time data may be transmitted to the server interface 650 and to the server 690. After authentication and selection of real-time data stream from a content provider, the mobile device 695 can receive the selected data stream through the communication network 675. Mobile device users with subscriptions can be notified of available data streams of transcribed content from video and/or radio programmers for user-specified zip codes, area codes, or country codes. The notifications may be sent from communication interface 660 with an e-mail alert or an audible alert.

In another implementation, the communication network 675 may receive captioned data from the communication network interface 660. In some exemplary implementations, the communication network interface 660 may remove control codes, if any, and transmit real-time text data received from a communication network to mobile devices 695 using the server 690 and the server interface 650. The communication network 675 may receive captioned data from decoded output of an encoder device at a video and/or radio program station. The communication network 675 may also receive caption data transcribed using voice-recognition technologies or through stenographic techniques of an audio broadcast. The received data may contain control codes or be in raw text form. Data passing through the subscription gateway may be encrypted by data security features 625, in which the data security features may be implemented in hardware or software. The data, whether encrypted or unencrypted, can be sent to communication network interface 660. In some implementations, subscriber authentication by user name and password can be performed by the subscriber data interface 630 accessing an external subscriber database 685. Caption content subscribers on mobile devices can enter a user name and a password on a mobile device and access streaming data after authentication. The subscribers can access transcribed, captioned video and/or radio programming being transmitted in real-time using real-time transcription technologies, such as voice recognition technology or stenographic-based technology.

In other implementations, video and/or radio station programmers can send alerts and messages to the communication network 675. The communication network 675 may include the apparatuses of an internet service provider that may have the capabilities of sending notifications of emergency and/or special reports of captioned data being transmitted by the station providers. The communication network interface 660 may receive the captioned data with or without control codes.

In some implementations, the subscriber data interface 630 may compare data provided by communication network 675 with such data provided in the internal database 625 or external database 685, and match station call sign data provided by stations to a zip code and/or a country code. In some implementations, the user preference data can be matched to the call sign data of stations of content providers to automatically match the news, messages, and alerts of the stations to a local zip code or country code for the subscriber. In these implementations, subscribers can automatically be able to receive captioned content from stations of content providers, such as a local news television station or a radio station. In some implementations, the content from the stations are not necessarily limited to the area code where the subscriber is located, but a subscriber may want to receive alerts and messages from stations located in other jurisdictions. For example the subscriber may be in one location (e.g., San Diego, Calif., area code 619) with their mobile device and may have user preferences with an area code (e.g., Charlotte, N.C., area code 704) to receive alerts and notifications for a different location.

In some implementations, the subscriber may have preferences for captioned real-time data from video and/or audio providers based on selected zip codes, area codes, or country codes of the video and audio providers. The subscriber data may be authenticated by the subscriber data interface 630. The subscriber database interface 630 may compare subscriber preferences and profiles, and can transmit alerts via the communication network 675 to one or more mobile device subscribers. In some implementations, the mobile device subscribers may be mobile phone subscribers. In other implementations, the mobile device subscribers may be using WiMax, the IEEE 802.16 Air Interface Standard. The mobile device subscribers can enter a user name and a password for authentication via the subscriber database interface 630.

In some implementations, the captioned data stream for a selected captioned video and/or radio program can be sent to the server interface 650 which can remove control codes, if any, and transmit the data to the server 690. The server can transmit TCP/IP data of real-time captioned data with no control codes to the communication network 675, which can multicast the captioned data to authenticated subscribers for receipt on one or more mobile devices.

In some implementations, the subscribers may have a free subscription to one or more content providers. The content providers can interact with a caption service provider to provide caption and/or transcription services to subscribers. In other implementations, the subscribers may have a fee-based subscription to the contents providers. Alternatively, the subscribers may have a free subscription to some free content providers and a fee-based subscription to fee-based content providers. The subscribers may have free or fee-based subscriptions to one or more caption service providers. The content providers and/or the caption service providers may provide captioned and/or transcribed data free for a limited time and for a fee at a later time. Subscription information, accounts, payments, terms and related information on the subscribers may be maintained in the subscription gateway database 625 and/or the external subscriber database 685.

The subscription gateway 610 may be implemented in software and/or hardware. One or more components (e.g., communication network interface 660, subscriber database interface 630, server interface 650) of the subscription gateway 610 may be implemented in software and/or hardware. The subscriber preferences may be sent from a webpage over the Internet to be entered into the subscription gateway.

Other implementations may be within the scope of the following claims.

What is claimed is:

1. A system for providing information for one or more mobile devices, the system comprising:
    a server for communicating to the one or more mobile devices for one or more users;
    a subscription gateway configured to receive a user preference for transcribed audio for an audio event associated with a geographic location specified by the user, the user preference comprising any of an area code, a country code, a zip code, a state name, a country name, a city name, a radio station identifier, or a television station identifier, the subscription gateway comprising a subscriber database to store information associated with the users of the one or more mobile devices or a user of a captioning device;
    a stenocaptioning device configured for transcribing audio for the audio event simultaneously with an occurrence of the audio event, the stenocaptioning device further configured to generate caption data that comprises transcribed data and control code data;
    a captioning device to receive the caption data; and
    a software tool configured to remove the control code data from the caption data to generate American Standard Code for Information Interchange (ASCII) text data,
    wherein the system is configured for transfer of the text data over the server to the one or more mobile devices and transfer of caption data to the captioning device,
    wherein the system is configured for transfers of the text data and caption data that occur coincidentally with the transcribing of audio for the audio event, and
    wherein the system is configured for concurrent transfer of the text data to the one or more mobile devices and the caption data to the captioning device.

2. The system in accordance with claim 1, wherein the system is configured to transfer the text data to at least two of the mobile devices simultaneously.

3. The system in accordance with claim 1, further comprising a communication network with Internet functionality, and wherein the subscription gateway is configured to send notices and alerts to users of the one or more mobile devices based on at least one user preference.

4. The system in accordance with claim 1, further comprising a subscription database that is external to the subscription gateway to store information associated with the users of the one or more mobile devices or the user of the captioning device, wherein the user preference further comprises a request for the transcribed audio.

5. The system in accordance with claim 1, wherein at least one of the devices comprises an Internet Protocol, wherein the radio and television station identifiers are associated with at least one audio source.

6. The system in accordance with claim 5, further comprising a decoder to decode the caption data for presentation on the captioning device, wherein the captioning device comprises a device including captioning functionality.

7. The system in accordance with claim 1, wherein the stenocaptioning device comprises a device with a stenographic keyboard, a computing device having software with captioning functionality, or a computing device having voice recognition software and captioning functionality.

8. The system in accordance with claim 1, wherein the subscription gateway comprises:
    a transcription device interface to interact with the stenocaptioning device;
    an encoder interface to interact with an external encoder that encodes the caption data;
    a subscriber database interface to interact with an external subscriber database configured to store information associated with the users of the one or more mobile devices or the user of the captioning device, wherein the information associated with the any of the users comprises subscriber preferences for the transcribed audio;
    a communication network interface to interact with a communication network; and
    a server interface to interact with the server, wherein the one or more mobile devices are configured to interact with the server and the communication network.

9. A method for sending transcribed audio information to one or more mobile devices, the method comprising:
    communicating, via a server, to the one or more mobile devices for one or more users;
    receiving, via a subscription gateway, a user preference for transcribed audio for an audio event associated with a geographic location specified by the user, the user preference comprising any of an area code, a country code, a zip code, a state name, a country name, a city name, a radio station identifier, or a television station identifier, the subscription gateway comprising a subscriber database to store information associated with the users of the one or more mobile devices or a user of a captioning device;

transcribing audio with a stenocaptioning device for the audio event simultaneously with an occurrence of the audio event, the stenocaptioning device being configured to generate caption data that comprises transcribed data and control code data;

receiving the caption data with the captioning device;

removing the control code data from the caption data with a software tool to generate American Standard Code for Information Interchange (ASCII) text data;

transferring the text data over the server to the one or more mobile devices; and transferring the caption data to the captioning device;

wherein the transfers of the text data and caption data occur coincidentally with the transcribing of audio for the audio event, and wherein there is concurrent transfer of the text data to the one or more mobile devices and the caption data to the captioning device.

10. The method in accordance with claim 9, the method further comprising:

searching the subscriber database to locate one or more users subscribed to receive the text data for the audio event.

11. The method in accordance with claim 10, further comprising:

receiving information associated with zip codes, telephone country codes, telephone number area codes, the city name, the state name, the country name, the radio station identifier, or the television station identifier from the one or more mobile devices;

comparing any of the received information with zip codes, telephone country codes, telephone number area codes, radio station identifiers, television station identifiers, audio sources, video sources, or city, state, or country names in the database; and providing the text data to the one or more mobile devices when information received from the one or more mobile devices corresponds with similar information in the database.

12. The method in accordance with claim 9, wherein the user preference for transcribed audio for the audio event comprises a preference for a type of audio event.

13. The method in accordance with claim 12, wherein any of the transfers of data utilizes a communication network comprising any one of a satellite channel, a telephony channel, an optical channel, a wireless channel, a cable channel, and an Internet channel, and wherein data related to the audio event is received based on the geographic location associated with any of the following: zip codes, telephone country codes, telephone number area codes, the city name, the state name, the country name, the radio station identifier, or the television station identifier, wherein the transcribed audio is associated with news, a weather report, a traffic report, a sporting event, a broadcasted event, or emergency information.

14. The method in accordance with claim 9, further comprising presenting one or more data streams of text from one or more audio events to users using the one or more mobile devices based on user preferences.

15. The method in accordance with claim 9, further comprising:

authenticating users of the one or more mobile devices based on user names and passwords in one or more databases; and transferring the text data to at least two of the mobile devices simultaneously, wherein the transfer to a first one of the at least two mobile devices at least partially overlaps in time with the transfer to a second one of the at least two mobile devices.

16. The method in accordance with claim 9, further comprising encrypting the text data prior to transferring the text data to the one or more mobile devices, wherein the radio and television station identifiers are associated with at least one audio source, over the communication network.

17. The method in accordance with claim 9, further comprising transferring data to the one or more devices for displaying the text data, the user preference, a menu of audio events, or geographic location information.

18. An article comprising a machine-readable medium storing instructions operable to cause a machine to perform operations comprising:

communicating, via a server, to one or more mobile devices for one or more users;

receiving, via a subscription gateway, a user preference for transcribed audio for an audio event associated with a geographic location specified by the user, the user preference comprising any of an area code, a country code, a zip code, a state name, a country name, a city name, a radio station identifier, or a television station identifier, the subscription gateway comprising a subscriber database to store information associated with the users of the one or more mobile devices or a user of a captioning device;

transcribing audio with a stenocaptioning device for the audio event simultaneously with an occurrence of the audio event, the stenocaptioning device being configured to generate caption data that comprises transcribed data and control code data;

receiving the caption data with the captioning device;

removing the control code data from the caption data with a software tool to generate American Standard Code for Information Interchange (ASCII) text data;

transferring the text data over the server to the one or more mobile devices; and transferring the caption data to the captioning device;

wherein the transfers of the text data and caption data occur coincidentally with the transcribing of audio for the audio event, and wherein there is concurrent transfer of the text data to the one or more mobile devices and the caption data to the captioning device.

19. The article in accordance with claim 18, further comprising instructions operable to cause the machine to perform operations comprising:

receiving information from one of the mobile devices for user preferences for media content to be sent to the mobile device;

searching one or more databases for media content, wherein the media content comprises streaming ASCII text data of the transcribed audio; and sending the text data to the mobile device that sent the information corresponding with the user preference, the user preference further comprising any of a video source identifier, or an audio source identifier.

20. The article in accordance with claim 19, further comprising instructions for selecting the media content based on any of the zip code, the area code, the country code, the radio station identifier, the television station identifier, the audio source identifier, or the video source identifier, wherein the radio and television station identifiers are associated with at least one audio source.

21. The article in accordance with claim 19, further comprising instructions for sending an alert or an indicator to the mobile device that the transcribed audio corresponding to user preferences is available to be sent to the mobile device.

22. The article in accordance with claim 19, wherein the media content comprises any of the following: a news report, a weather report, a traffic report, a sporting event, a broadcasted event, or emergency information that is associated with any of the zip code, the area code, the country code, the city name, the state name, the country name, the radio station identifier, the television station identifier, the audio source identifier, or the video source identifier.

23. The article in accordance with claim 18, wherein the transcribed data is generated from a stenocaptioning device, a computing device having software with captioning functionality, or a computing device including voice recognition software and captioning functionality.

24. The article in accordance with claim 18, further comprising instructions for displaying the text data on the one or more mobile devices as the text data arrives to the one or more mobile devices.

25. The article in accordance with claim 24, further comprising instructions to cause the text data to be displayed as scrolling text, and further comprising instructions to transfer the text data via the Internet.

* * * * *

UNITED STATES PATENT AND TRADEMARK OFFICE
CERTIFICATE OF CORRECTION

PATENT NO. : 7,421,477 B2  Page 1 of 1
APPLICATION NO. : 11/087023
DATED : September 2, 2008
INVENTOR(S) : Richard F. Pettinato It is certified that error appears in the above-identified patent and that said Letters Patent is hereby corrected as shown below:

In column 14, line 53, in claim 8, delete "with the any" and insert -- with any --.

In column 16, line 13, in claim 16, delete "source, over the communication network" and insert -- source over a communication network --.

Signed and Sealed this

Second Day of December, 2008

JON W. DUDAS
*Director of the United States Patent and Trademark Office*